United States Patent
Dede et al.

(10) Patent No.: US 9,845,018 B2
(45) Date of Patent: Dec. 19, 2017

(54) SELF-ALIGNING WIRELESS POWER TRANSFER

(71) Applicant: Toyota Motor Engineering & Manufacturing North America, Inc., Erlanger, KY (US)

(72) Inventors: Ercan Mehmet Dede, Ann Arbor, MI (US); Debasish Banerjee, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 216 days.

(21) Appl. No.: 14/705,366

(22) Filed: May 6, 2015

(65) Prior Publication Data

US 2016/0325630 A1 Nov. 10, 2016

(51) Int. Cl.
| | | |
|---|---|---|
| *B60L 11/18* | (2006.01) | |
| *H02J 7/02* | (2016.01) | |
| *H02J 50/90* | (2016.01) | |
| *H02J 50/80* | (2016.01) | |
| *H02J 7/00* | (2006.01) | |

(52) U.S. Cl.
CPC ......... *B60L 11/182* (2013.01); *B60L 11/1824* (2013.01); *H02J 7/025* (2013.01); *H02J 50/80* (2016.02); *H02J 50/90* (2016.02); *H02J 2007/0001* (2013.01)

(58) Field of Classification Search
CPC ..... B60L 11/182; B60L 11/1824; H02J 50/80; H02J 7/025; H02J 50/90; H02J 2007/0001
See application file for complete search history.

(56) References Cited

U.S. PATENT DOCUMENTS

| | | | |
|---|---|---|---|
| 7,399,202 B2 | 7/2008 | Dayan et al. | |
| 7,952,322 B2 | 5/2011 | Partovi et al. | |
| 8,729,859 B2 | 5/2014 | Cook et al. | |
| 8,796,990 B2 | 8/2014 | Paparo et al. | |
| 9,118,203 B2 * | 8/2015 | Davis | H02J 5/005 |
| 2010/0259217 A1 * | 10/2010 | Baarman | H02J 5/005 320/108 |
| 2010/0277121 A1 | 11/2010 | Hall et al. | |
| 2011/0184842 A1 * | 7/2011 | Melen | B60L 5/005 705/34 |
| 2012/0112553 A1 | 5/2012 | Stoner, Jr. et al. | |
| 2013/0113422 A1 * | 5/2013 | Lee | H01Q 1/526 320/108 |
| 2014/0367832 A1 | 12/2014 | Marino et al. | |

* cited by examiner

*Primary Examiner* — Nha Nguyen
(74) *Attorney, Agent, or Firm* — Christopher G. Darrow; Robert C. Okonowski; Darrow Mustafa PC (57) ABSTRACT

An apparatus and method of wirelessly charging a battery are disclosed. The wireless charging system may include a charge receiver, charge transmitter, and an active control sheet. The active control sheet may include a plurality of cells. The plurality of cells may be activated or deactivated according to the location of the charge receiver relative to the charge transmitter. Charging may be initiated, and electrical charge transferred, from the charge transmitter, through the activated cells on the active control sheet, and to the charge receiver.

20 Claims, 6 Drawing Sheets

SELF-ALIGNING WIRELESS POWER TRANSFER

TECHNICAL FIELD

The present disclosure relates generally to battery charging systems, and, specifically, to wireless charging stations for electrically powered vehicles.

BACKGROUND

Charging of electric vehicles is a relatively recent technological development. As vehicle technology shifts from gas-powered engines to battery powered engines, charging the battery becomes a new task for drivers.

Many electric vehicles require a plug that extends from a wall outlet to the vehicle and charges the battery. However, drivers may forget to plug in their vehicle and may try to drive their vehicle only to find a dead battery.

In order to address the problem of drivers forgetting to plug in their vehicles, wireless charging was implemented to charge the vehicle's batteries. However, wireless charging requires absolute alignment of a charge transmitter with a charge receiver. If the charge transmitter and charge receiver are not absolutely aligned, charging may become inefficient. It may be difficult, and require many attempts, for a driver to pull into the exact spot necessary for lateral and longitudinal alignment of the charge transmitter with the charge receiver. Also, where the charge transmitter and charge receiver are not aligned, the charge transmitter may output a magnetic field outside of the charge receiver and cause interference with other vehicle components, along with possible health risks to nearby vehicle occupants and pedestrians.

SUMMARY

The present disclosure describes an apparatus and method of wirelessly charging a battery.

A charging apparatus for wirelessly charging a battery is disclosed. The charging apparatus includes a charge transmitter, a charge receiver, and an active control sheet. The charge transmitter may be of a first size. The charge receiver may be movable relative to the charge transmitter. The charge receiver may be of a second size, where the second size is different from the first size. The active control sheet may include a plurality of cells. The plurality of cells may be activated or deactivated based on a location of the charge receiver relative to the charge transmitter. The active control sheet may generate a magnetic field received by the charge receiver. The magnetic field may induce a current in the charge receiver for charging a battery.

Also, a wireless charging station including a charge transmitter and active control sheet is disclosed. The active control sheet may include a plurality of cells. The plurality of cells may be activated or deactivated according to a location of a charge receiver relative to the charge transmitter when the charge receiver is present at the wireless charging station. The active control sheet may be configured to selectively transmit electrical charge from the charge transmitter through the plurality of cells activated.

Lastly, a method of wirelessly charging a battery is disclosed. The method may detect a location of a charge receiver for a battery when the charge receiver is located at a charging station. The method may activate at least one cell on an active control sheet corresponding to the location. Finally, the method may transmit a magnetic field from a charge transmitter at the charging station, through the at least one cell activated, and to the charge receiver on the vehicle.

BRIEF DESCRIPTION OF THE DRAWINGS

The description herein makes reference to the accompanying drawings wherein like reference numerals refer to like parts throughout the several views, and wherein.

DETAILED DESCRIPTION

The present disclosure describes an apparatus and method for wirelessly charging a battery. The wireless charger includes a charge transmitter, an active control sheet, and a charge receiver. When the charge receiver is in the proximity of the charge transmitter, the charge receiver's location is detected relative to the charge transmitter. Cells on the active control sheet are activated corresponding to the charge receiver's location, and a magnetic field is transmitted from the charge transmitter, through the activated cells on the active control sheet, and to the charge receiver.

Figure 1:
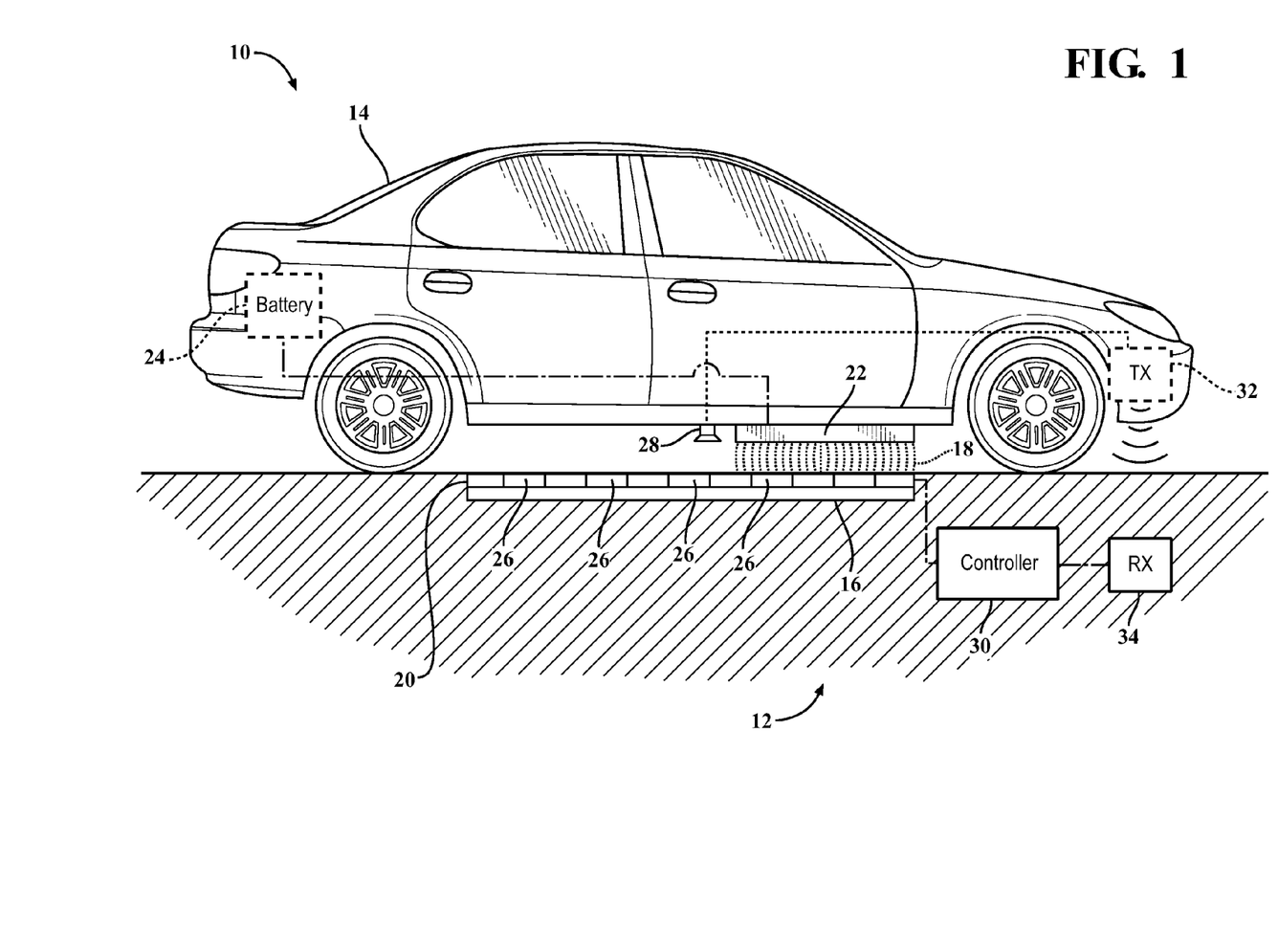
FIG. 1 is a side view of a wireless charging system.

Referring now to FIG. 1, a wireless charging system 10 is shown through a side view. The wireless charging system 10 includes a charging station 12 and a vehicle 14.

The charging station 12 includes a charge transmitter 16, which is connected to a power source (not shown). The power source may be an AC power source, or a DC power source. The charging station 12 may also include shut-off circuitry (not shown), in order to enable or disable the charging station 12 based on whether the vehicle 14 is present at the charging station 12. The charging station 12 may generally output a magnetic field 18 for charging the vehicle 14. The charging station 12 further includes an active control sheet 20. The vehicle 14 includes a charge receiver 22 for receiving the magnetic field 18, and a battery 24.

When the vehicle 14 is present at the charging station 12, the charge transmitter 16 generates an incident magnetic field, which induces a magnetic field on the active control sheet 20. The induced magnetic field of the active control sheet 20 is interposed on the incident magnetic field. After interposition of the incident magnetic field and the induced magnetic field, the resulting magnetic field, referred to herein as the magnetic field 18, is output by the charging station 12 and received by the charge receiver 22.

Figure 2:
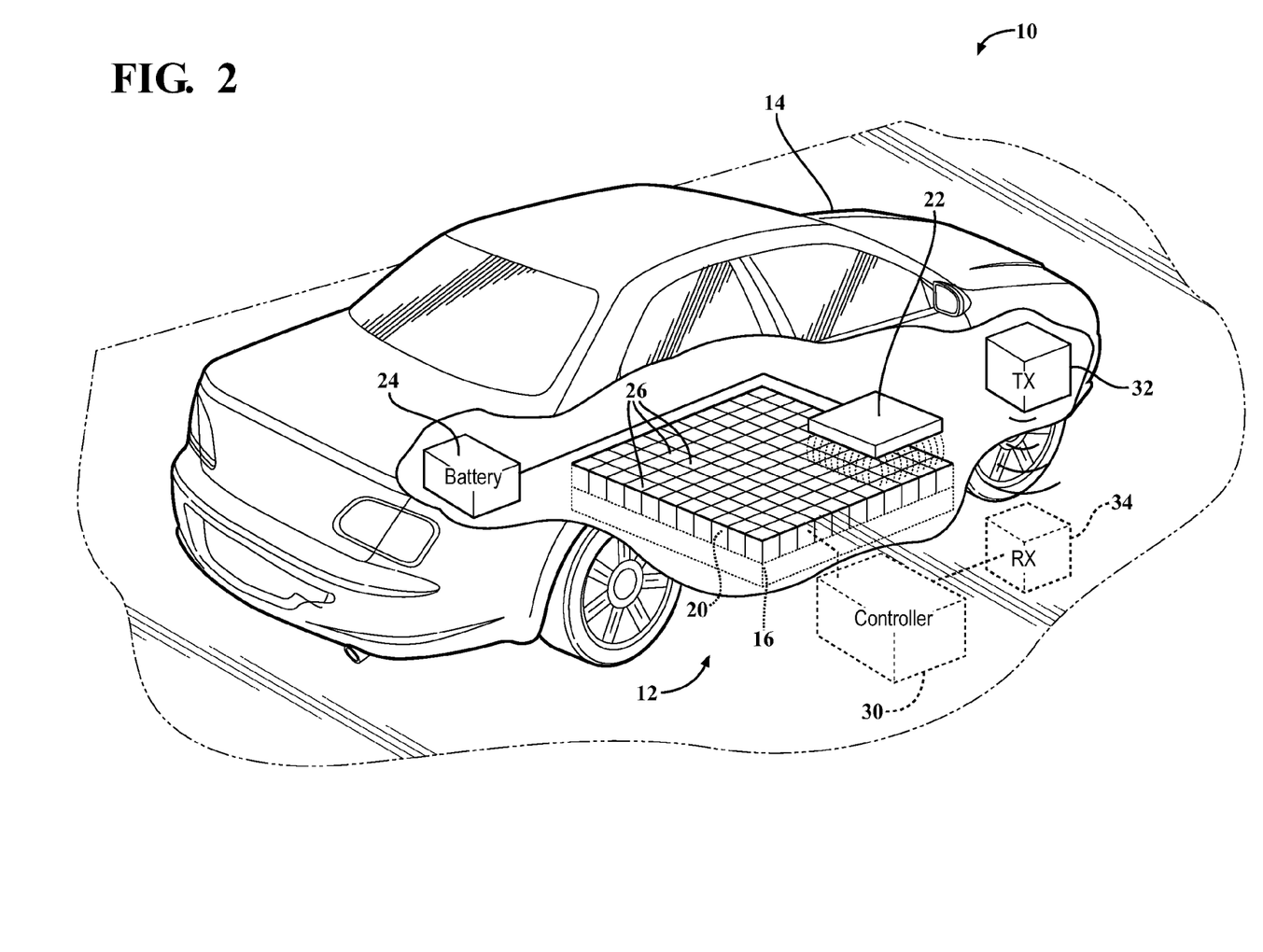
FIG. 2 is a perspective view of the wireless charging system of FIG. 1.

The charge transmitter 16 is of a first size, and the charge receiver 22 is of a second size, where the second size is different from the first size. As shown in FIG. 1 and FIG. 2, the first size of the charge transmitter 16 is greater than the second size of the charge receiver 22. When present at the charging station 12, the charge receiver 22 receives the magnetic field 18 from the charge transmitter 16 and active control sheet 20 at the charging station 12, and induces current to charge the battery 24. The charge receiver 22 is movable relative to the charge transmitter 16.

The charge transmitter 16 may be a coil, solenoid, induction pad, or any other means of outputting the magnetic field 18 capable of wirelessly charging the battery 24. Similarly, the charge receiver 22 may be a coil, solenoid, induction pad, or any other means of receiving the magnetic field 18, and converting the magnetic field 18 into current for charging the battery 24. Also, the charge receiver 22 is ideally operated at a charge receiving frequency. Typical charging frequencies are at 10 MHz, however many different frequencies can be used. Also, the charge receiver may be manufactured or configured to have a charge receiving resonant frequency.

The magnetic field 18 generated by the charge transmitter 16 and active control sheet 20 may interact with the charge receiver 22 when the vehicle 14 is present at the charging station 12. The magnetic field 18 induces a secondary magnetic field in the charge receiver 22. The secondary magnetic field induces current in the charge receiver 22. The current induced in the charge receiver 22 is transferred to the battery 24, thus charging the battery 24. Although not shown, there may be additional protective circuitry between the charge receiver 22 and the battery 24, such as current or voltage regulators, cut-off circuits, and other protective circuitry generally used in battery charging circuits.

The active control sheet 20 includes a plurality of cells 26. The number of cells 26 may be based on application, and many different cell 26 configurations may be used and still be within the scope of the present disclosure.

The cells 26 may be activated or deactivated based on the relative position of the vehicle 14 to the charging station 12.

The vehicle 14 may approach and park at the charging station 12. Where shut-off circuitry is included, the charging station 12 detects the presence of the vehicle 14 and enables the charge transmitter 16 to generate the magnetic field 18. As the vehicle 14 approaches the charging station 12, the charge receiver 22 interacts with the charging station 12. A sensor 28 may determine the location of the charge receiver 22 relative to the charge transmitter 16. Although the sensor 28 is shown in FIG. 1 as being attached to the vehicle 14, one skilled in the art can appreciate that the sensor 28 may also be positioned on the charging station 12.

The sensor 28 may be an optical sensor, a laser or light sensor, a weight sensor, a radar sensor, or any other sensing means capable of detecting the presence and location of a vehicle 14. Additionally, although a single sensor 28 is depicted in FIG. 1, multiple sensors 28 may be used to determine the presence and location of the vehicle 14 at the charging station 12.

For exemplary purposes in demonstrating how to determine the relative location of the charge receiver to the active control sheet, the sensor 28 is shown mounted on the bottom of the vehicle 14. The sensor 28 may be a camera sensor. When the vehicle 14 is parked at the charging station 12, the sensor 28 captures an image of the ground underneath the vehicle 14. The image is processed in order to detect a corner of the active control sheet 20, along with an edge of the active control sheet 20. The vehicle 14 compares the corner and edge of the active control sheet 20 with the mounting position of the sensor 28 under the vehicle 14 in relation to the charge receiver 22, and a field of view of the sensor 28. Based on this comparison, the relative position and orientation of the charge receiver 22 to the charge transmitter 16 and active control sheet 20 can be obtained.

In an alternative example, the sensor 28 may be an optical sensor, and reflective coating (not shown) is coated or positioned on the surface of the cells 26 of the active control sheet 20. As the vehicle 14, and accordingly the sensor 28, passes over the active control sheet 20 and is eventually parked over the active control sheet 20, an incoming path of the vehicle 14 is determined based on the sensor 28 detecting cells 26 as the vehicle 14 pulls into the parking spot. The vehicle 14, or the charging station 12, may keep a count of the number of cells 26 that the vehicle passes over based on a number of times the sensor 28 detects the reflective tape. Additionally, when the vehicle 14 stops moving, the sensor 28 will be directly over a single cell 26 on the active control sheet 20. Accordingly, a fixed position of the sensor 28 relative to the active control sheet 20 may be determined. If the fixed position and incoming path of the sensor 28 is determined, and the sensor 28 is at a fixed location from the charge receiver 22 of the vehicle 14, then the location of the charge receiver 22 relative to the active control sheet 20 is determinable.

Although the previous examples are described to show how the relative location of the charge receiver 22 to the active control sheet 20, any method of determining a relative location known of the art, including those using multiple sensors 28, may be used in the charging station 12 or the vehicle 14.

The wireless charging system 10 may further include a controller 30, a data transmitter 32, and a data receiver 34. The controller 30 may receive data from the data receiver 34, and activate or deactivate the cells 26 of the active control sheet 20 based on the data it receives. As shown in FIG. 1 and FIG. 2, the data transmitter 32 is positioned in the vehicle 14, and the data receiver is positioned at the charging station 12. The controller 30 may be positioned either in the vehicle 14, or at the charging station 12. However, where the controller 30 is positioned in the vehicle 14, the data receiver may be in communication with the active control sheet 20 directly, as opposed to the controller 30 being in communication with the active control sheet 20 (as shown in FIG. 1 and FIG. 2). Furthermore, the data transmitter 32 and data receiver 34 may be able to cross-communicate. Accordingly, it does not matter where either the data transmitter 32 and data receiver 34 are mounted, so long as one is mounted in the vehicle 14 and the other is mounted at the charging station 12.

The controller 30 may be a microcontroller, a microprocessor, a CPU, a dedicated circuit, or any other component that can receive and interpret information, and output data to control one or more devices.

The data transmitter 32 may transmit at least one identifier, defined herein as vehicle identification data, regarding the type of charge receiver 22, location data collected from the sensor 28 corresponding to the location of the charge receiver 22 relative to the charge transmitter 16, dimensions or size of the charge receiver 22, a number of cells to activate based on the size of the charge receiver 22, and any other identifiers that the controller 30 may use to activate or deactivate cells 26 on the active control sheet 20. The data transmitter 32 may be any one of an RFID transmitter, Bluetooth transmitter, Wi-Fi transmitter, beacon technology, and any other data transmitting means capable of wirelessly broadcasting data. Similarly, the data receiver 34 may be any one of an RFID receiver, Bluetooth receiver, Wi-Fi receiver, beacon technology, or any other data receiving means capable of wirelessly receiving data.

Referring now to FIG. 2, a perspective view of the wireless charging system 10 is shown.

Figure 7:
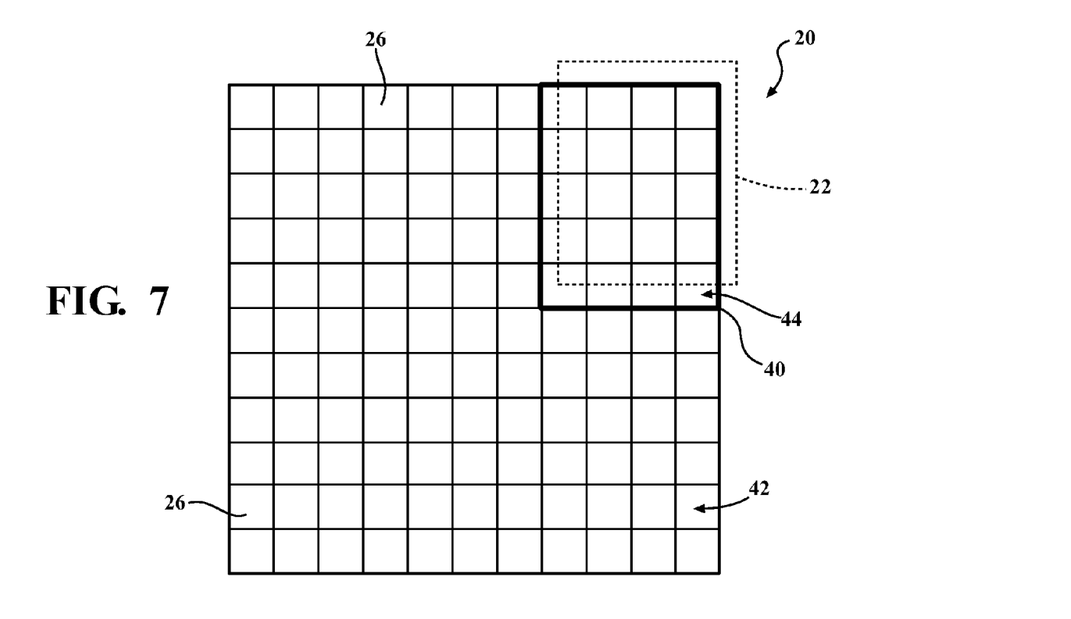
FIG. 7 is a top view of an alternative activation shape of the active control sheet of FIG. 3.

As shown in FIG. 2, lateral and longitudinal alignment of the charge receiver 22 to the charge transmitter 16 is not necessary. So long as the charge receiver 22 is above the charge transmitter 16 and within the periphery of the charge transmitter 16, there is no need to laterally or longitudinally align the charge receiver 22 with the charge transmitter 16. As shown in FIG. 7 and described below, the charge receiver 22 does not necessarily have to be positioned within the periphery of the charge transmitter 16. Cells 26 on the active control sheet 20 directly below the charge receiver 22 will be activated, and the magnetic field 18 of FIG. 1 produced by the charge transmitter 16 will be concentrated to just the activated cells 26 on the active control sheet 20.

Figure 3:
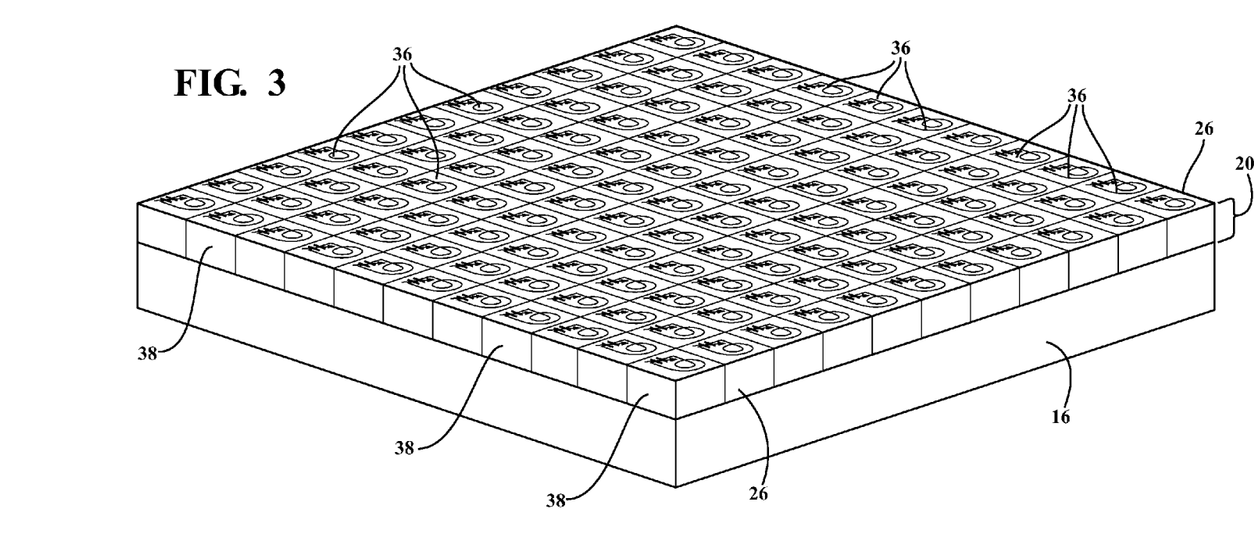
FIG. 3 is a perspective view of an active control sheet of the wireless charging system of FIG. 1.
Figure 3A:
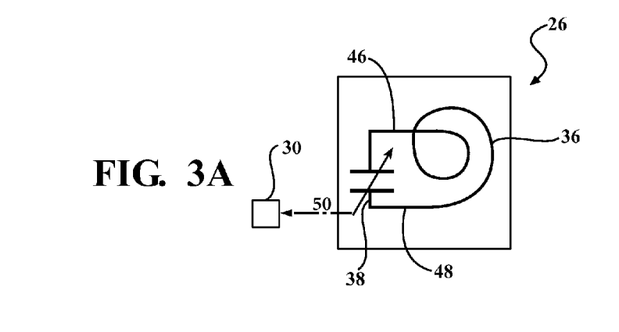
FIG. 3A is a top view of a single cell on the active control sheet of FIG. 3.

Referring now to FIG. 3 and FIG. 3A, a perspective view of the active control sheet 20 is shown. FIG. 3A is a top view of a single cell 26 on the active control sheet 20.

The active control sheet 20 may be constructed as a printed circuit board. Although cells 26 are shown as generally partitioned from one another, the cells 26 may be generally referring to regions on the surface of the active control sheet 26. The active control sheet 20 may also include a weather-proof layer [not shown]. The weather-proof layer may be a sealant deposited, coated, positioned, or sprayed on top of the active control sheet 20 to protect the active control sheet 20 from weather-related damage. Also, although the active control sheet 20 is shown as having a square shape in FIGS. 1 through 7, the active control sheet 20 may be constructed in any shape, including various polygonal shapes, circular shapes, oval shapes, or any other shapes. Also, the plurality of cells 26, generally shown as having sides extending parallel to the sides of the active control sheet 20, may have sides extending orthogonal or perpendicular to the sides of the active control sheet 20.

Each of the plurality of cells 26 of the active control sheet 20 may include a magnetic loop or coil 36, and a capacitor 38. As shown in FIG. 3A, the coil and capacitor may be connected in series, forming an L-C circuit. The coil 36 may be of a fixed inductance. Although shown in FIGS. 3 and 3A as a coil, the coil 36 may be a loop, a solenoid, a resonator, or any other inductive device. The capacitor 38 may be a variable capacitor. When a magnetic field is generated in the active control sheet 20, the magnetic field 18 may be controlled by adjusting a resonant frequency in each of the cells 26. Although FIG. 3 shows all cells 26 having variable capacitors, some cells, such as those on the perimeter of the active control sheet 20, may only have fixed capacitors depending on the application.

The resonant frequency of a circuit is a function of the inductance, L, and capacitance, C, according to:

$$f_o = \frac{1}{2\pi\sqrt{LC}} \quad (1)$$

Accordingly, the resonant frequency, $f_o$, of each cell 26 may be tuned by adjusting the capacitance of the variable capacitor. Although the present disclosure describes a fixed inductance and variable capacitance, in an alternative example, fixing the capacitance and having a variable inductor may achieve the same output. Therefore, generally at least one variable electrical component is required, where variable electrical component may be any one of a variable capacitor, and a variable inductor.

Where a variable capacitor is used, the variable capacitor has three terminals; a positive terminal 100, a negative terminal 102, and a control terminal 50 of 3A. The controller 30 of FIGS. 1 and 2 may apply an analog voltage to the control terminal. The analog voltage may be a range of voltages, where that ranged voltage is directly or inversely proportional to the capacitance of the variable capacitor.

For exemplary purposes, the following description describes a three-terminal variable capacitor. It should be understood that other variable capacitors, such as varicap diodes, or varactors could be used.

The three-terminal variable capacitor may be a metal-oxide semiconductor capacitor construction. Capacitance, C, is calculated by:

$$C = \frac{\epsilon_{ox}}{d} W \times L \quad (2)$$

where $\epsilon_{ox}$ is the dielectric constant, d is the thickness of the dielectric layer, and W and L are the width and length of the capacitor, respectively. For the exemplary three-terminal capacitor device described herein, the control terminal of the device extends from an n$^+$-type doped region. The positive terminal 100 extends from a p$^+$-type doped region. The negative terminal 102 extends from a p-type doped region, the p-type doped region also being the substrate layer of the device, and is separated from the p-type doped region by a dielectric layer. $X_L$ is the distance between the capacitance plate of the negative terminal 102 and the n$^+$-type doped region. L is the length of the capacitance plate of the negative terminal 102. $X_L$ can be used to regulate the capacitance values range. Applying an analog DC voltage to the control terminal adjusts the capacitance of the variable capacitor by adjusting $X_L$. If the control voltage of the control terminal 50 is increased, the depletion region of the pn-junction between the negative terminal 102 and the control terminal 50 widens under the dielectric layer. Widening of the depletion region of the pn-junction leads to reducing the area, W×L of equation 2, of the equivalent electrode formed by the p-substrate, and with it the effective capacitance area and value.

The control terminal 50 of all the variable capacitors 38 on the active control sheet 20 may be connected to the controller 30. The controller 30 may adjust the resonant frequency by varying the voltage applied to the control terminal 50. By adjusting the resonant frequency of each cell 26, the current that would be generated in that cell 26 would be varied as well. The higher the resonant frequency of a circuit relative to surrounding resonant frequencies, the less current is generated in that corresponding circuit. As shown in equation 1, an increase in capacitance will decrease the resonant frequency. The impedance, $Z_c$, of a capacitor can be characterized as $$Z_c = \frac{1}{j2\pi fC} \quad (3)$$

Accordingly, by decreasing the resonant frequency, the impedance is increasing, and therefore the current in the corresponding LC circuit will be decreased.

In example one below, it can be seen that adjusting the current directly effects the magnetic field 18 strength in the cell 26 and, accordingly, over the active control sheet 20.

Figure 4:
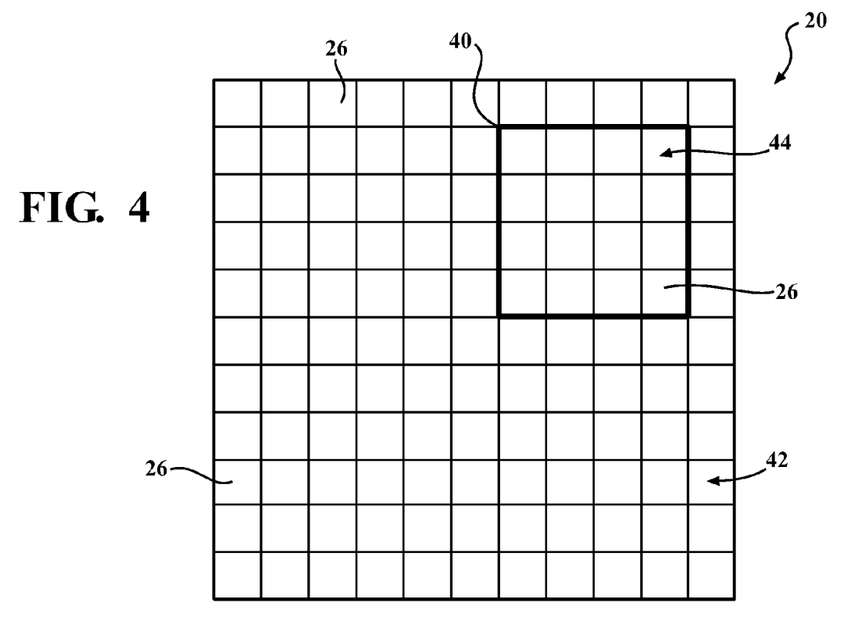
FIG. 4 is a top view of an exemplary activation shape of the active control sheet of FIG. 3.
Figure 5:
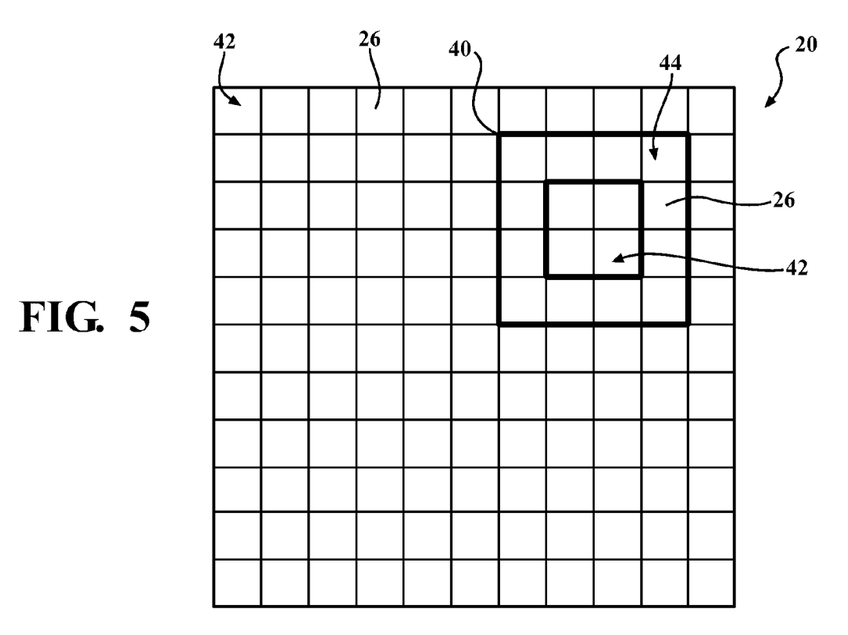
FIG. 5 is a top view of an alternative activation shape of the active control sheet of FIG. 3.

Referring now to FIGS. 4 and 5, top views of activation shapes 40 of the active control sheet 20 are shown.

Where the magnetic field 18 is manipulated to have null spots, i.e. no magnetic field, over some cells 26 and magnetic field 18 in other cells 26, activation shapes 40 can be maintained on the active control sheet 20. The activation shapes 40 may correspond to a magnetic field 18 shape for charging the battery 24.

Referring now to FIGS. 4 through 7, top views of alternative activation shapes 40 of the active control sheet 20 are shown.

As shown in FIGS. 4 and 5, the activation shape 40 may be rectangular (shown in FIG. 4), a ring-like structure (shown in FIG. 5), or any other shape that may be constructed on the active control sheet 20 by activating or deactivating cells 26.

The activation shape 40 may be based on any one of the type of vehicle 14, the type of battery 24, and the type of charge receiver 22.

The data transmitter 32 of FIGS. 1 and 2 may output any one of a vehicle identifier, activation shape code, and the like. Based on the data received from the data transmitter 32, the controller 30 may activate a specific activation shape 40 by activating selected cells 26 on the active control sheet 20 for the specific vehicle 14. The activation shape 40 may correspond to a shape of the magnetic field 18 for charging the battery 24.

Based on the discussion above, the activation shape 40 may be created by tuning a first group of variable electrical components to output a first resonant frequency in a first region 42 of the plurality of cells 26 in the active control sheet 20, and tuning a second group of variable electrical components to output a second resonant frequency in a second region 44 of the plurality of cells 26 in the active control sheet 20, where the first resonant frequency is different from the second resonant frequency. In one example, the first resonant frequency may be less than the second resonant frequency. Also, the activation shape 40 may be made up of the cells 26 in the second region 44. The second resonant frequency may be substantially the same as the charge receiver resonant frequency. Accordingly, the second resonant frequency in the second region 44 may correspond to the location of the charge transmitter 16 of FIGS. 1 and 2 relative to the charge receiver 22, and the cells 26 in the second region 44 may be considered the activated cells 26. The cells 26 in the first region 42 with the first resonant frequency are where the magnetic field 18 is not transmitted, or null points.

Figure 6:
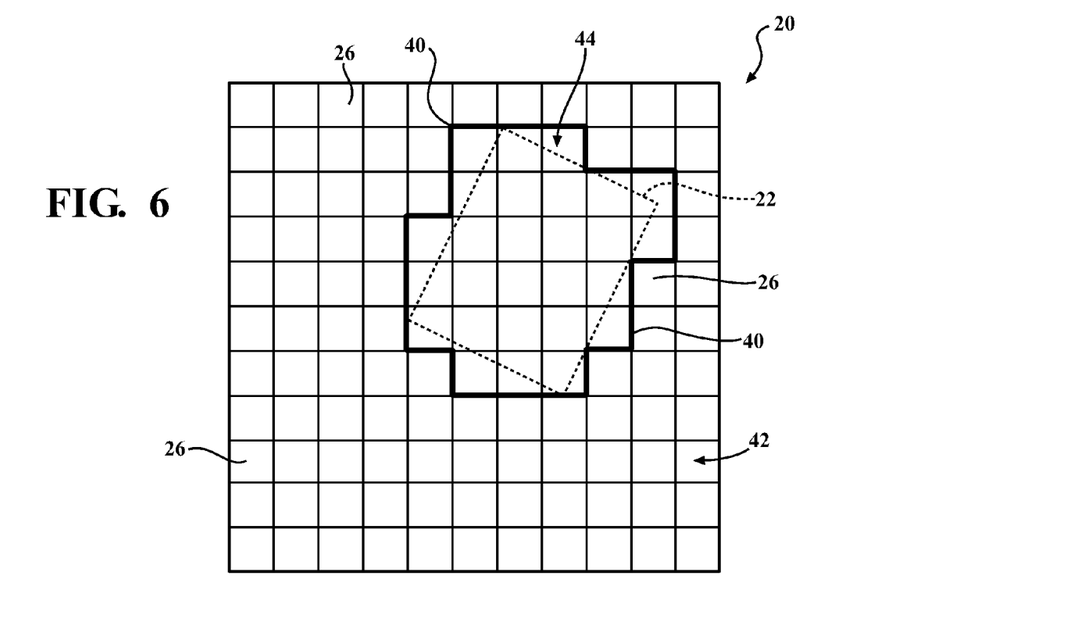
FIG. 6 is a top view of an alternative activation shape of the active control sheet of FIG. 3.

Additionally, as shown in FIGS. 6 and 7, the charge receiver 22, shown in phantom, does not need to be laterally and longitudinally aligned with the cells 26 of the active control sheet 20.

In FIG. 6, edges of the charge receiver 22 are not parallel with edges of the active control sheet 20. However, the second region 44 of the active control sheet 20 includes those cells 26 that are directly below the charge receiver 22. The activation shape 40 appears pixilated because the edges of the charge receiver 20 are not parallel with the edges of the active control sheet 20. The pixilation of the activation 40 shape may be lessened if more cells are included, much like images appear less pixilated where more pixels are added.

Also, as shown in FIG. 7, the charge receiver 22 does not necessarily have to be within the periphery of the active control sheet 20. Although, in this example, the efficiency of charging the battery 24 would be lessened, the system would still be operable, albeit in a less efficient manner. The cells 26 in the second region 44 in this example would be, again, all those cells 26 on the active control sheet 20 that are positioned directly below the charge receiver 22.

EXAMPLE ONE

The following example is an analytic model for characterizing the behavior of the magnetic field 18 of FIG. 1. The example, however, should not be taken in a limiting sense and is only to show one possible implementation. Many other practical methods may be used and still be within the scope of the present disclosure.

In this example, we will consider the active control sheet as having 4 cells ×4 cells. For this particular model, the coil 36 is a loop. The cells will be labeled using coordinates (m,n), where m and n are numbered 1 through 4. On the active control sheet 20, p represents the distance between midpoints on the cells 26, and a represents the radius of the loop, depicted as coil 36 in the figures, in each of the cells 25. Global coordinates (x, y, z) are used to describe general location on the active control sheet 20. Also, local coordinates $(R,\phi,z)$ will be used to describe position in cells 26 on the active control sheet 20. Local coordinates $(R,\phi,z)$ are a cylindrical coordinate system, where R is the radius of a cylinder, $\phi$ is the angle extending from x on the global coordinates, and z is the height of the cylinder.

First, it must be recognized that, as current is induced and the battery 24 is charged, the magnetic field 18 will be varied as a function of the current, where $\nabla \times \vec{H} = \vec{i}$. The magnetic field 18 variance is incorporated in the analytic model by introducing a delta function. The magnetic field 18 of a specific cell 26 (m,n) at a point (R, $\phi$, z) is given by an integration of the current source multiplied by the free space Green's function, characterized as follows:

$$\vec{H}_{m,n}(R, \varphi, z) = \int\int\int G(R, \varphi, z, R', \varphi' z') \nabla \times \vec{I}_{m,n}(R', \varphi' z') dv' \quad (4)$$

$$= \int\int\int \frac{-\frac{\partial I_{m,n,\varphi'}}{\partial z'}\vec{R} + \frac{1}{R'}\frac{\partial}{\partial R'}(R'I_{m,n,\varphi'})\vec{z}}{\sqrt{R^2 + R'^2 - 2RR'\cos(\varphi - \varphi') + (z-z')^2}} R' dR' d\varphi' dz'$$

Accordingly, the magnetic field 18 over a region of the active control sheet 20 would be a sum of the magnetic field 18 of all the cells 26 and the incident magnetic field, $\vec{H}_{in} = H_0 \exp(j\omega t)\vec{z}$:

$$H_{reg} = \vec{H}_{m,n}(x, y, z) + \vec{H}_{in}, \quad (5)$$

where $$x = R\cos(\varphi) + 2p(2m - 5/2), \quad y = R\sin(\varphi) + 2p(2n - 5/2),$$

respectively. Solving for $H_{reg}$ enables one to determine the magnetic field strength over a certain area. For example, $H_{reg} = 0$ would determine null spots, i.e. cells where the magnetic field 18 is 0. However, where $H_{reg}$ is non-zero, the magnetic field strength for a particular region can be adjusted by changing $\vec{H}_{\zeta,m,n}$, which includes adjusting the current as stated above.

Figure 8:
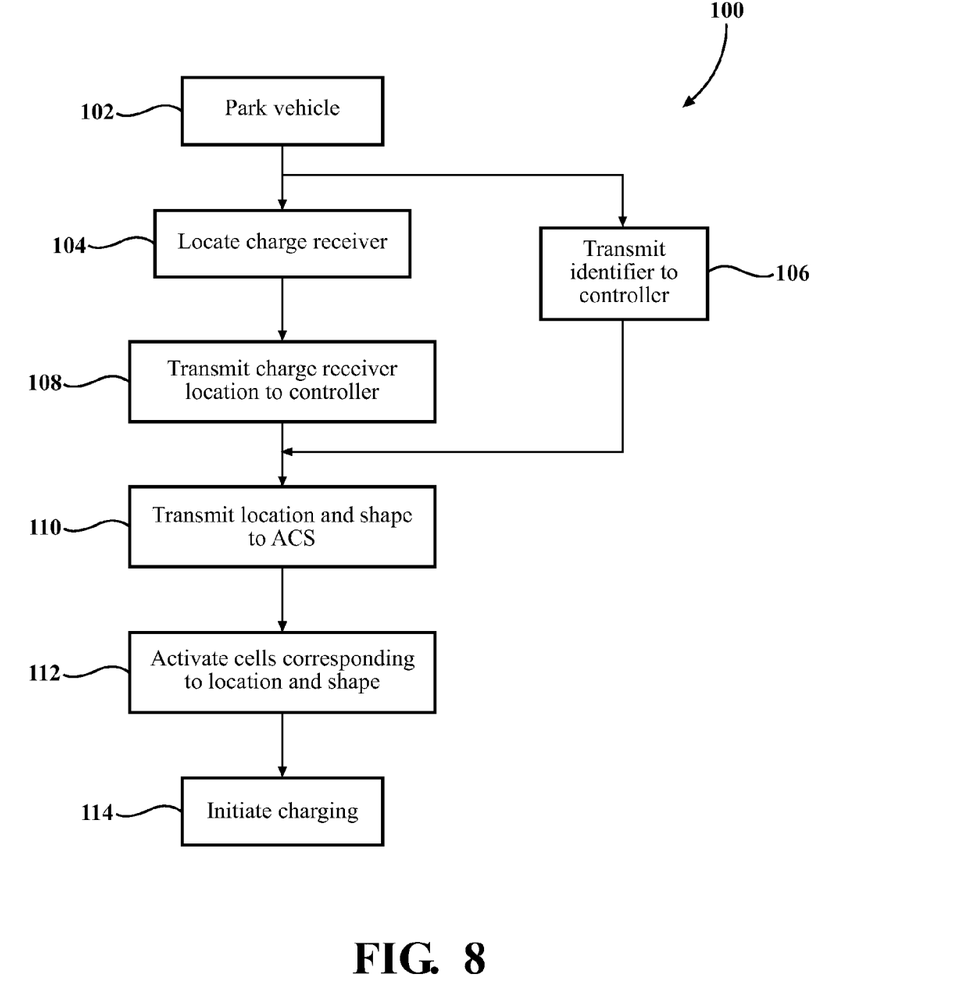
FIG. 8 is a flow chart showing a method of wirelessly charging a battery.

Referring now to FIG. 8, a method of wirelessly charging the battery 24 is shown through a flow chart 100 with reference to the structural components described above.

At logic step 102, the vehicle 14 approaches and parks at the charging station 12. As the vehicle 14 approaches and parks at the charging station 12, the sensor 28 locates the charge receiver 22 at logic step 104. Also, at logic step 106, the vehicle 14 may transmit at least one identifier to the controller 30. The at least one identifier may correspond to the magnetic field 18 activation shape 40 of the second region 44 on the active control sheet 20.

At logic step 108, the vehicle 14 may transmit, or the charging station 12 may determine, the location of the charge receiver 22, and transmit the location to the controller 30.

Once the controller 30 has the location of the charge receiver 22 relative to the charge transmitter 16, and the identifier if used, at logic step 110, the controller 30 may transmit the location and identifier to the active control sheet 20. At logic step 112, cells 26 are activated on the active control sheet 20 corresponding to the location and shape of the charge receiver 22 relative to the charge transmitter 16. The cells 26 are activated by the controller 30, in order to create the activation shape 40 corresponding to the magnetic field 18 shape for charging based on the identifier.

The flow chart 100 may further include tuning a resonant frequency in the at least one cell 26. The flow chart 100 may include tuning a first resonant frequency in the first region 42 of the active control sheet 20, and tuning a second resonant frequency in the second region 44 of the active control sheet 20. The first resonant frequency may be less than the second resonant frequency. Transmitting the magnetic field 18 may include transmitting the magnetic field 18 from the charge transmitter 16, through the second region 44 of the active control sheet 20, and to the charge receiver 22.

Once the cells 26 are activated, at logic step 114, charging is initiated. The magnetic field 18 may be transmitted from the charge transmitter 16, through the at least one activated cell 26, and to the charge receiver 22 of the vehicle 14. Furthermore, the at least one cell 26 activated may correspond to the second region 44, and therefore the magnetic field 18 may be transmitted from the charge transmitter 16, through the second region 44, and to the charge receiver 22.

It should be noted that, although the vehicle 14 throughout the detailed description and accompanying figures is shown as an automobile, the vehicle 14 may also be an airplane, a space ship, a boat, a golf cart, or any other vehicle that is capable of wireless charging. Furthermore, although the foregoing description is shown using a vehicle as an example, in an alternative embodiment, the wireless charging system may be applied to other devices capable of wireless charging, such as a mobile device, i.e. cell phone or smart phone, iPad, laptop, etc.

The foregoing description is merely illustrative in nature and is in no way intended to limit the disclosure, its application, or uses. As used, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

Also, coordinate systems, such as those described in example one above, are simply to provide one example, and many examples may be used and be within the scope of the present disclosure. Accordingly, coordinate systems (x, y, z) and (R, φ, z) should not be taken in any limiting sense and are merely used for exemplary purposes.

The headings (such as "Background" and "Summary") and sub-headings used herein are intended only for general organization of topics within the present disclosure, and are not intended to limit the disclosure of the technology or any aspect thereof. The recitation of multiple aspects having stated features is not intended to exclude other aspects having additional features, or other aspects incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an aspect can or may comprise certain elements or features does not exclude other aspects of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

What is claimed is:

1. A charging apparatus for wirelessly charging a battery comprising:
    a charge transmitter generating an incident magnetic field;
    a charge receiver movable relative to the charge transmitter; and
    an active control sheet receiving the incident magnetic field from the charge transmitter, the active control sheet having a plurality of cells, wherein at least one of the plurality of cells includes a variable electrical component, and wherein the active control sheet generates a magnetic field from the incident magnetic field by tuning the variable electrical component based, at least in part, on a location of the charge receiver, the magnetic field being received by the charge receiver for charging a battery.

2. The charging apparatus of claim 1 wherein the charge transmitter is of a first size, and the charge receiver is of a second size less than the first size.

3. The charging apparatus of claim 1 further comprising a sensing means for detecting the location of the charge receiver.

4. The charging apparatus of claim 3 wherein the sensing means is at least one of an optical sensor, a light sensor, a weight sensor, and a radar sensor.

5. The charging apparatus of claim 1 further comprising:
    a controller operatively connected to the variable electrical component; and
    a data transmitting means for communicating an identifier to the controller, wherein the controller tunes the variable electrical component based, at least in part, on the identifier.

6. The charging apparatus of claim 5 wherein the identifier corresponds to a shape of the magnetic field.

7. The charging apparatus of claim 1 wherein the variable electrical component is a variable capacitor.

8. The charging apparatus of claim 1 further comprising a controller operatively connected to the variable electrical component, wherein the controller tunes the variable electrical component to adjust a resonant frequency of the at least one of the plurality of cells.

9. The charging apparatus of claim 1 wherein a first group of variable electrical components is timed to output a first resonant frequency in a first region of the plurality of cells, and a second group of variable electrical components is tuned to output a second resonant frequency in a second region of the plurality of cells, the second group of variable electrical components comprising the variable electrical component.

10. The charging apparatus of claim 9 wherein the first resonant frequency is different from the second resonant frequency, and wherein the second region of the plurality of cells corresponds to the location of the charge receiver.

11. A wireless charging station comprising:
a charge transmitter generating an incident magnetic field; and
an active control sheet receiving the incident magnetic field from the charge transmitter, the active control sheet having a plurality of cells, at least one of the plurality of cells including a variable electrical component, wherein the active control sheet generates a magnetic field from the incident magnetic field by tuning the variable electrical component based, at least in part, on a location of a charge receiver present at the wireless charging station, the magnetic field inducing a current in the charge receiver.

12. The wireless charging station of claim 11 further comprising a controller operatively connected to the variable electrical component, the controller receiving data corresponding to the location of the charge receiver relative to the active control sheet, and the controller tuning the variable electrical component.

13. The wireless charging station of claim 11 wherein the variable electrical component is tuned to have a resonant frequency based, at least in part, on the location of the charge receiver relative to the active control sheet.

14. The wireless charging station of claim 12, wherein the controller receives at least one identifier corresponding to an activation shape, and tunes the variable electrical component based, at least in part, on the activation shape and the location of the charge receiver.

15. A method of wirelessly charging a battery at a charging station, the method comprising:
detecting a location of a charge receiver for a battery;
tuning a variable electrical component in at least one of a plurality of cells of an active control sheet, the variable electrical component tuned based, at least in part, on the location of the charge receiver; and
generating, via the tuned variable electrical component, a magnetic field from an incident magnetic field of a charge transmitter, the magnetic field being received by the charge receiver for charging the battery.

16. The method of claim 15 further comprising receiving an identifier corresponding to an activation shape of the magnetic field.

17. The method of claim 16 wherein tuning the variable electrical component comprises tuning a group of variable electrical components including the variable electrical component according to, at least, the location of the of the charge receiver and the activation shape to generate the magnetic field.

18. The method of claim 15, wherein tuning the variable electrical component comprises tuning the variable electrical component to adjust a resonant frequency in the at least one cell.

19. The method of claim 15 wherein tuning the variable electrical component comprises tuning a first group of variable electrical components to output a first resonant frequency in a first region of the active control sheet, and tuning a second group of variable electrical components to output a second resonant frequency in a second region of the active control sheet, wherein first group of electrical components comprises the variable electrical component, and wherein the first resonant frequency is different from the second resonant frequency.

20. The method of claim 19, wherein the second resonant frequency is substantially the same as a resonant frequency of the charge receiver, and wherein generating the magnetic field comprises generating the magnetic field in the second group of the plurality of cells.

* * * * *

UNITED STATES PATENT AND TRADEMARK OFFICE
CERTIFICATE OF CORRECTION

PATENT NO. : 9,845,018 B2
APPLICATION NO. : 14/705366
DATED : December 19, 2017
INVENTOR(S) : Ercan Mehmet Dede and Debashish Banerjee It is certified that error appears in the above-identified patent and that said Letters Patent is hereby corrected as shown below:

In the Claims

Column 11, Line 9, "is timed to" should be -- is tuned to --

Signed and Sealed this
Thirteenth Day of March, 2018

Andrei Iancu
*Director of the United States Patent and Trademark Office*